United States Patent
Law

[11] Patent Number: 6,133,901
[45] Date of Patent: Oct. 17, 2000

[54] METHOD AND SYSTEM FOR WIDTH INDEPENDENT ANTIALIASING

[75] Inventor: Patrick Law, Milpitas, Calif.

[73] Assignee: Silicon Graphics, Inc., Mountain View, Calif.

[21] Appl. No.: 09/053,208

[22] Filed: Mar. 31, 1998

[51] Int. Cl.$^7$ ...................................................... G09G 5/20
[52] U.S. Cl. ............................................................ 345/136
[58] Field of Search ..................................... 345/136, 137, 345/443; 382/269

[56] References Cited

U.S. PATENT DOCUMENTS 6,038,031  3/2000  Murphy ..................................... 345/136

OTHER PUBLICATIONS

"Computer Gaphics: Priciples and Practice", Foley et al., pp. 132–137, 622, 623, and 967, Jul. 1997.

Primary Examiner—Jeffery Brier
Attorney, Agent, or Firm—Wagner, Murabito & Hao LLP

[57] ABSTRACT

An efficient method for width independent antialiasing of point primitives and line primitives in a frame buffer of a graphics computer system. The graphics computer system calculates an integral of an impulse response of a low pass filter. A plurality of values representative of the integral of the impulse response are stored in a look-up table. The plurality of values are indexed with respect to distance. A primitive is rasterized into the frame buffer, wherein the primitive is either a point primitive or a line primitive. The distance of a resulting fragment from the center of the primitive is then calculated. The look-up table is then entered using the distance as an argument, and a corresponding one of the plurality of values is retrieved. This value is used as a blending weight for the fragment. The color of the fragment is then blended into the frame buffer using the one of the plurality of values as the blending weight. In so doing, the primitive is properly antialiased regardless of its width.

20 Claims, 6 Drawing Sheets

METHOD AND SYSTEM FOR WIDTH INDEPENDENT ANTIALIASING

FIELD OF THE INVENTION

The field of the present invention pertains to computer graphics. More particularly, the present invention relates to an apparatus and method for generating antialiased images in a computer graphics system.

BACKGROUND OF THE INVENTION

Computer graphics are being used today to perform a wide variety of tasks. Many different areas of business, industry, government, education, entertainment, and most recently, the home, are tapping into the enormous and rapidly growing list of applications developed for today's increasingly powerful computer devices. For example, graphical user interfaces have largely replaced textual interfaces as the standard means for user computer interaction.

In most computer graphic systems an image is represented as a raster (an array) of logical picture elements (pixels). A pixel is usually a rectangle, but can be other shapes. The computer graphics system assigns parameter values to each pixel. These parameter values are digital values corresponding to certain attributes of the image (e.g. color, depth, etc.) measured over a small area of the image represented by a pixel. Typically each graphical image is represented by thousands of combined pixels.

In a computer generated image, objects are typically described by "primitives" (usually mathematically described polygons and polyhedra) that define the shape of the primitive, the primitive attributes, and the connectivity and positioning data describing how the primitives fit together. The primitives are subsequently drawn by rendering their pixels in a frame buffer. For example, a point primitive, essentially a circular disc, is rendered as a small group of pixels, the number of which depending upon the display resolution of the computer system's display. A line primitive, often referred to as a vector primitive, is typically rendered as a line of pixels from one point to another, the line being a number of pixels wide depending upon the line's thickness and the display's resolution. An example of a more complex line primitive is a "polyline", which is comprised of two or more line primitives drawn end to end. As the primitives are rasterized onto the array of pixels, the primitives are broken down into small pieces called fragments. Each fragment is the size of a pixel or smaller.

Generally, the fragment or fragments within each pixel determine the image characteristics (e.g., color and the like) of that pixel. The computer system processes the fragments for each pixel of the pixel array to create a graphical image. Some computer systems may include special-purpose processors, each custom tailored to specific graphics functions. The main graphical processing function of the CPU (or special-purpose processors) is to take the specifications of graphical primitives specified by application programs (for example, point primitives and line or polyline primitives) and to render the primitives onto the pixel array in a manner which best represents characteristics of the desired image.

Traditional, low cost graphics rendering systems, however, often generate lines and points in which the edges of the lines or points appear jagged or "aliased". Aliasing artifacts result from the fact that the primitives are drawn in a finite resolution pixel array. More specifically, aliasing artifacts appear when a continuous image is sampled at discreet pixel centers and displayed on a finite resolution screen.

Prior Art FIG. 1A is an illustration of a simple line drawn on a bi-level pixel display. Prior Art FIG. 1B is an expanded view of FIG. 1A. In each column of pixels the line moves through, the color of the pixel nearest the line is set. Each time the line crosses between columns in which the pixels closest to the line are not in the same row, there is a sharp "jag" in the appearance of the line. This characteristic holds true for point primitives and other scan converted primitives, such as polygons. The "jaggies" or "stair stepping" is the result of this "all or nothing" approach to scan conversion in which each pixel is replaced with the primitive's color, or is left unchanged. Stair stepping is a common instance of the phenomenon called "aliasing". The application of techniques that reduce or eliminate aliasing are referred to as "antialiasing" and the rendered images produced using these techniques are said to be "antialiased." Antialiasing removes these aliasing effects from an image and gives the primitive edges a much smoother appearance.

There are many antialiasing techniques published that address the stair stepping problem. These methods are successful to some degree, but have limitations in their implementation. To make the antialiasing process less computationally demanding, many antialiasing techniques utilize look-up tables to implement the filtering functions described above. In such a look-up table technique, a filtered profile of the primitive is stored in the look-up table. The parameters of a fragment, for example, the distance of the center of the fragment from the center of the primitive, are used to index the table and retrieve a corresponding filtered version of the primitive. This filtered version is then rendered. The process of indexing the look-up table with a parameter of a fragment and retrieving the filtered parameter is much less costly than more sophisticated techniques, such as calculating the area of a fragment and blending the fragment using the area.

The problem with the above look-up table method is the fact that the values stored in the table are very much dependent upon the characteristics of the primitive. The look-up table stores the actual profile of a filtered primitive. Typically, the table is loaded with values suited to provide the best antialiasing for the particular characteristics of the primitives being rendered. The quality of antialiasing obtained from this method, depend upon the degree to which the primitives being rendered match the values loaded in the look-up table. For example, where an image includes numerous line primitives and point primitives, the look-up table is loaded with values which yield the best antialiasing for the characteristics of these primitives, for example, the width of the lines and points. So long as primitives having these characteristics are being rendered, this prior art look-up table method yields good results.

The problem with this method, however, is that if the width or position of the line primitives or the size of the point primitives changes, the antialiasing performance of this conventional look-up table method deteriorates. For a table of a given size, for example, if the table is loaded in accordance with antialiasing line primitives of a given width, the table will not properly antialias line primitives which are significantly wider. The antialiasing quality quickly degrades as the width of the line primitives increase, since there are fewer storage locations within the table representing the "fall off" in intensity at the edges of the primitive.

Prior Art FIG. 1C and FIG. 1D graphically depict the problem resulting from changing width. Lines 150 and 151 represent intensity, lines 152 and 153 represent the normalized distance along the antialiased direction of the primitive, and the profiles 155 and 156 represent the intensity of the primitive for a two color bi-level pixel display. Lines 152 and 153 each have a plurality of marks 160 representative of storage locations within a look-up table. Profile 155 is less wide than profile 156. Thus, profile 155 has a much smoother fall off region 170, than the fall off region 171 of profile 156.

Another limitation of this method is the requirement that the table be reloaded in accordance with the particular primitives being rendered. This is too slow for use in more demanding applications. Generating the table on the fly could save main memory but further reduces the performance.

Thus, there is a need for a width independent antialiasing process which is inexpensive to implement, yet highly effective. The required solution should use less memory than prior art antialiasing solutions of comparable quality, and not require repetitive processor intensive calculations. The required solution should be fast enough for demanding applications, without requiring very expensive, high performance graphics hardware for its implementation. Additionally, what is needed is a solution which provides high quality, width independent antialiasing, wherein the antialiasing quality does not degrade as the width of the graphics primitives change.

SUMMARY OF THE INVENTION

The present invention provides an antialiasing process which is inexpensive to implement, yet highly effective. The system of the present invention uses less memory than prior art antialiasing solutions of comparable quality, and does not require repetitive, processor intensive, calculations. The process of the present invention is fast enough for demanding applications, without requiring very expensive, high performance graphics hardware for its implementation. Additionally, the process of the present invention provides high quality, width independent antialiasing, wherein the antialiasing quality does not degrade as the width of the graphics primitives change.

In one embodiment, the present invention provides an efficient method for width independent antialiasing of point primitives and line primitives in a frame buffer of a graphics computer system. The graphics computer system calculates the samples of the integral of the impulse response of a low pass filter. A plurality of values representative of the integral of the impulse response are stored in a look-up table and form a filter profile. The plurality of values are indexed with respect to distance. A primitive is rasterized into the frame buffer, wherein the primitive is either a point primitive or a line primitive. The distance of a resulting fragment from the center of the primitive is calculated.

This distance is used to determine an upper limit for the integration and a lower limit for the integration. The upper and lower limits are used to index the look-up table and return an upper limit value (alpha) and a lower limit alpha. These alphas correspond to samples of the integral of the filter profile. The present invention subsequently combines the upper limit alpha and the lower limit alpha, integrating the filter profile from the upper limit to the lower limit, to determine a fragment alpha, or blending weight. The color of the fragment is then blended with the color of the pixel corresponding to the fragment using the blending weight, and the resulting pixel data (e.g., pixel color) is stored in the frame buffer. In so doing, the primitive is properly antialiased regardless of its width and the antialiasing quality does not degrade as the widths of the graphics primitives being rendered change.

BRIEF DESCRIPTION OF THE DRAWINGS

The present invention is illustrated by way of example and not by way of limitation, in the figures of the accompanying drawings and in which like reference numerals refer to similar elements and in which.

Prior Art

Prior Art

Prior Art

Prior Art

DETAILED DESCRIPTION OF THE INVENTION

Figure 1A:
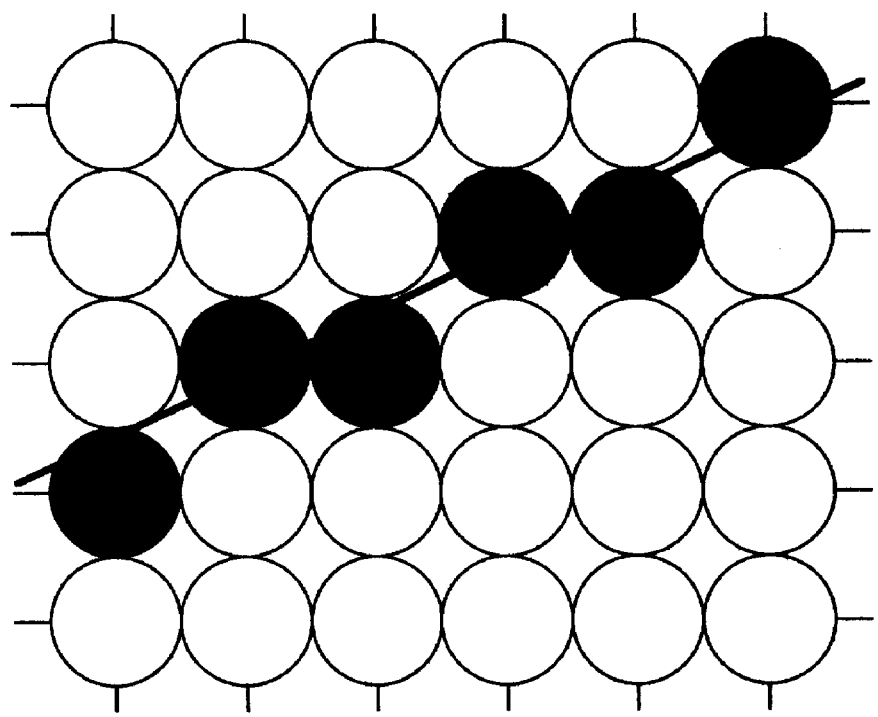
FIG. 1A is an illustration of a simple line drawn on a bi-level pixel display.
Figure 1B:
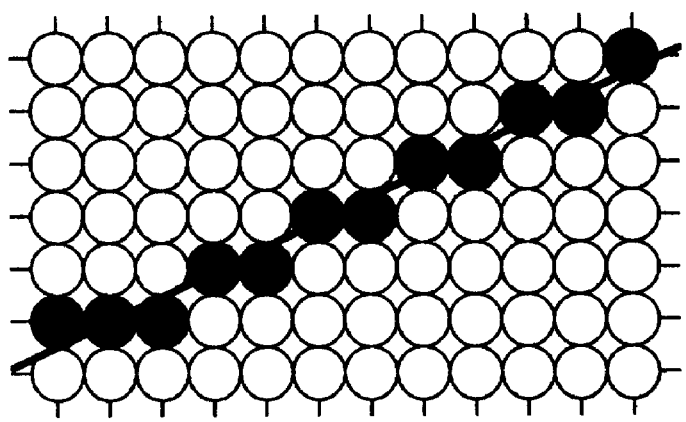
FIG. 1B is an expanded view of the line drawn on the bi-level pixel display of FIG. 1A.
Figure 1C:
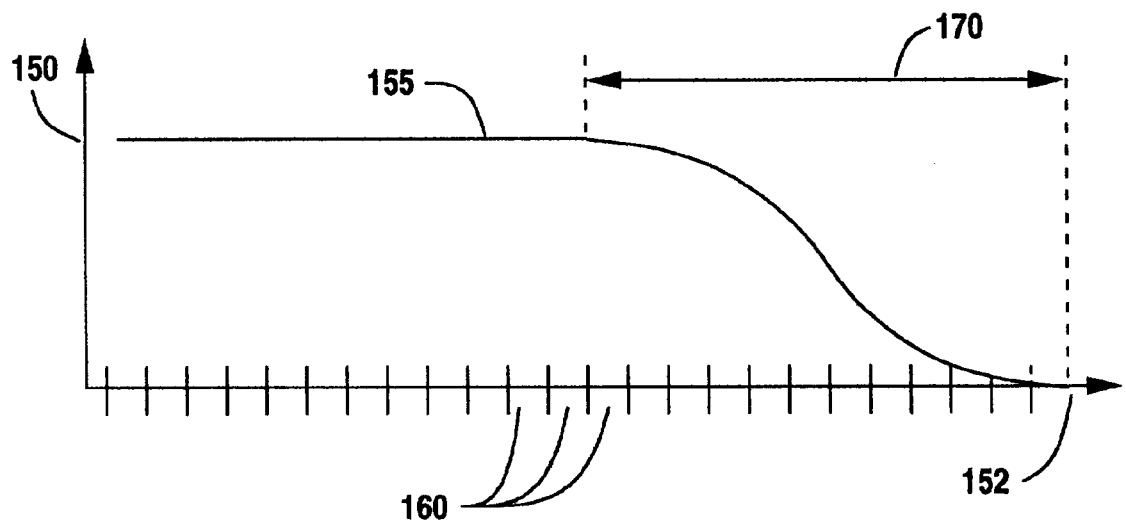
FIG. 1C shows a line profile and the corresponding entries in an antialiasing look-up table of a first width.
Figure 1D:
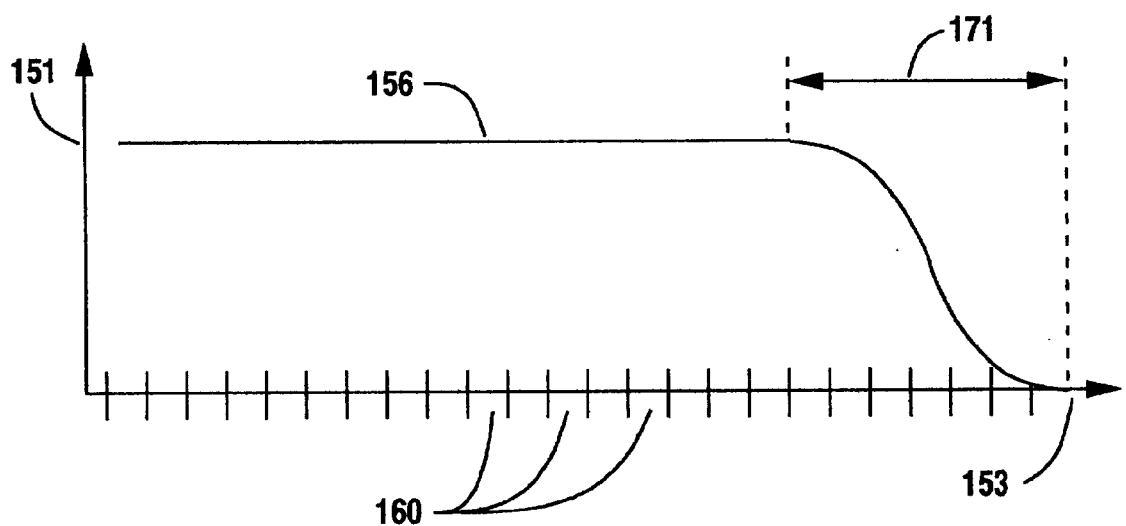
FIG. 1D shows a line profile and the corresponding entries in an antialiasing look-up table of a second width.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention provides an antialiasing process which is inexpensive to implement, yet highly effective. The system of the present invention uses less memory than prior art antialiasing solutions of comparable quality, and does not require repetitive processor intensive calculations. The process of the present invention is fast enough for demanding applications, without requiring very expensive, high performance graphics hardware for its implementation. Additionally, the process of the present invention provides high quality, width independent antialiasing, wherein the antialiasing quality does not degrade as the width of the graphics primitives change. The present invention and its benefits are further described in the discussions which follow.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "processing" or "calculating" or "integrating" or "matching" or "indexing" or "storing" or the like, refer to the action and processes of a computer system (e.g., computer system 200 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

Figure 2:
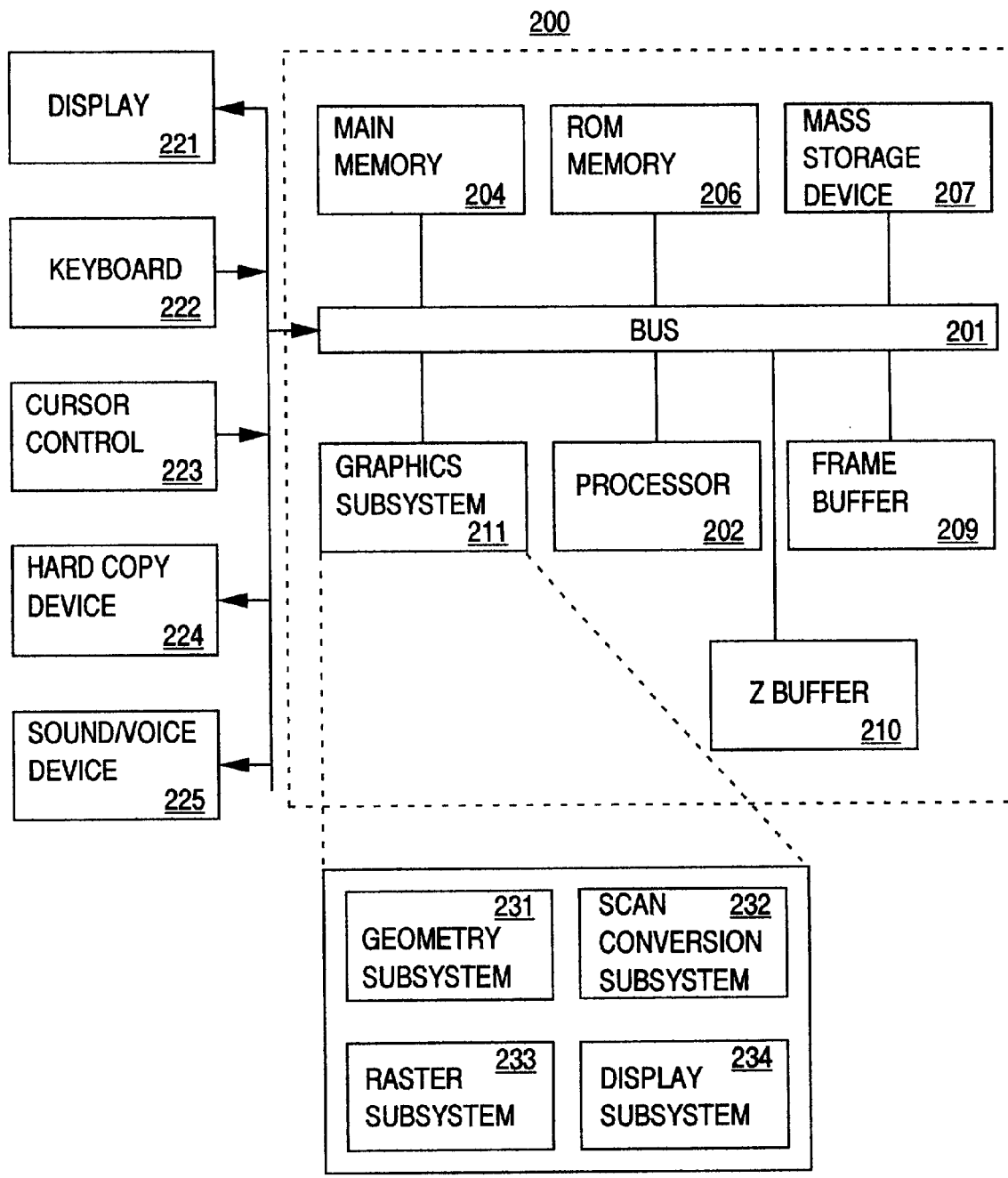
FIG. 2 shows a block diagram of 3D graphics computer system upon which the present invention may be practiced.

FIG. 2 shows a 3D graphics computer system 200 upon which the present invention may be practiced. System 200 includes any computer controlled graphics systems for generating complex or 3 dimensional images. Computer system 200 includes a bus 201 for transmitting digital information between the various parts of the computer system. One or more microprocessors 202 are coupled to bus 201 for processing information. The information along with the instructions of how the information is to be processed are stored in a hierarchical memory system comprised of mass storage device 207, read only memory 206, and main memory 204. Mass storage device 207 is used to store vast amounts of digital data. The mass storage device 207 can consist one or more hard disk drives, floppy disk drives, optical disk drives, tape drives, CD ROM drives, or any number of other types of storage devices having media for storing data digitally. A read only memory (ROM) 206 is used to store digital data of a permanent basis, such as instructions for the microprocessors. Main memory 204 is used for storing digital data on an intermediate basis. Main memory 204 can be dynamic random access memory (DRAM).

A 3D graphics rendering system 211 is an option which can be included in system 200. Processor 202 provides the graphics system 211 with graphics data, such as drawing Commands, coordinate vertex data, and other data related to an object's geometric position, color, texture, shading, and other surface parameters. The object data is processed by graphics system 211 in the following four pipelined stages: geometry subsystem 231, scan conversion subsystem 232, raster subsystem 233, and a display subsystem 234. The geometry subsystem 231 converts the graphical data from processor 202 into a screen coordinate system. It is the function of the geometry subsystem 231 to perform the projection and transformation process to give depth to a displayed object. The resulting primitives (points, lines, polygons, polyhedra, and the like) supplied by the geometry subsystem 231 are then supplied to the scan conversion subsystem 232. It is the function of the scan conversion subsystem 232 to then generate pixel data (e.g., fragments, fragment parameters, color information, and the like) based on these primitives. The scan conversion subsystem 232 performs the interpolation functions to interpolate straight lines so that each intermediate value need not be individually and separately calculated by the geometry subsystem. Next, the pixel data is sent to the raster subsystem 233, whereupon Z-buffering, blending, texturing, and antialiasing functions are performed. The resulting pixel values are subsequently stored in frame buffer 209, and the Z values are stored in the Z buffer 210. The display subsystem 234 reads the frame buffer 209 and displays the image on monitor 221.

Several other devices may also be coupled to system 200. For example, an alphanumeric keyboard 222 is used for inputting commands and other information to processor 202. Another type of user input device is cursor control device 223 (a mouse, trackball, joystick, and the like) used for positioning a movable cursor and selecting objects on a computer screen. Another device which may be coupled to bus 201 is a hard copy device 224 (e.g., a laser printer) for printing data or other information onto a tangible medium. Additionally, a sound recording or video option 225 can be coupled to the system 200 to provide multimedia capabilities.

Width Independent Antialiasing

The present invention comprises a new process for generating antialiased images in a 3D graphics rendering system. The present invention provides an antialiasing process which is inexpensive to implement, yet highly effective. Antialiasing is the method that removes these aliasing effects from an image and gives point primitives and line primitives a much smoother appearance. The "jaggies" or "stair stepping" is the result of scan conversion in which the color of each of the pixels is replaced with the color of the primitives. Stair stepping is a common instance of the aliasing phenomenon. The present invention is an apparatus and method that reduces or eliminates aliasing and alias artifacts from point primitives and line primitives without regard to their width.

The antialiasing process of the present invention functions by processing fragments in the fragment operations stage of a graphics processing subsystem (e.g., graphics subsystem 211 of FIG. 2). A fragment, as defined by the present invention, is part of a pixel covered by a polygon. A pixel may contain fragments from many polygons. In like fashion, a polygon may cover more than one pixel. A pixel has a finite area and is considered to have either a square or a round shape. The total area of a pixel is typically assigned to be 1.0. Thus, a fragment can have an area between 0 and 1.0. Each fragment within a pixel contributes its color to the overall color of the pixel. This contribution generally depends upon the area of the fragment. The color of a pixel is the weighted average of colors of all fragments contained within the pixel and the weight of each individual fragment is determined by the fragment's area.

Figure 3:
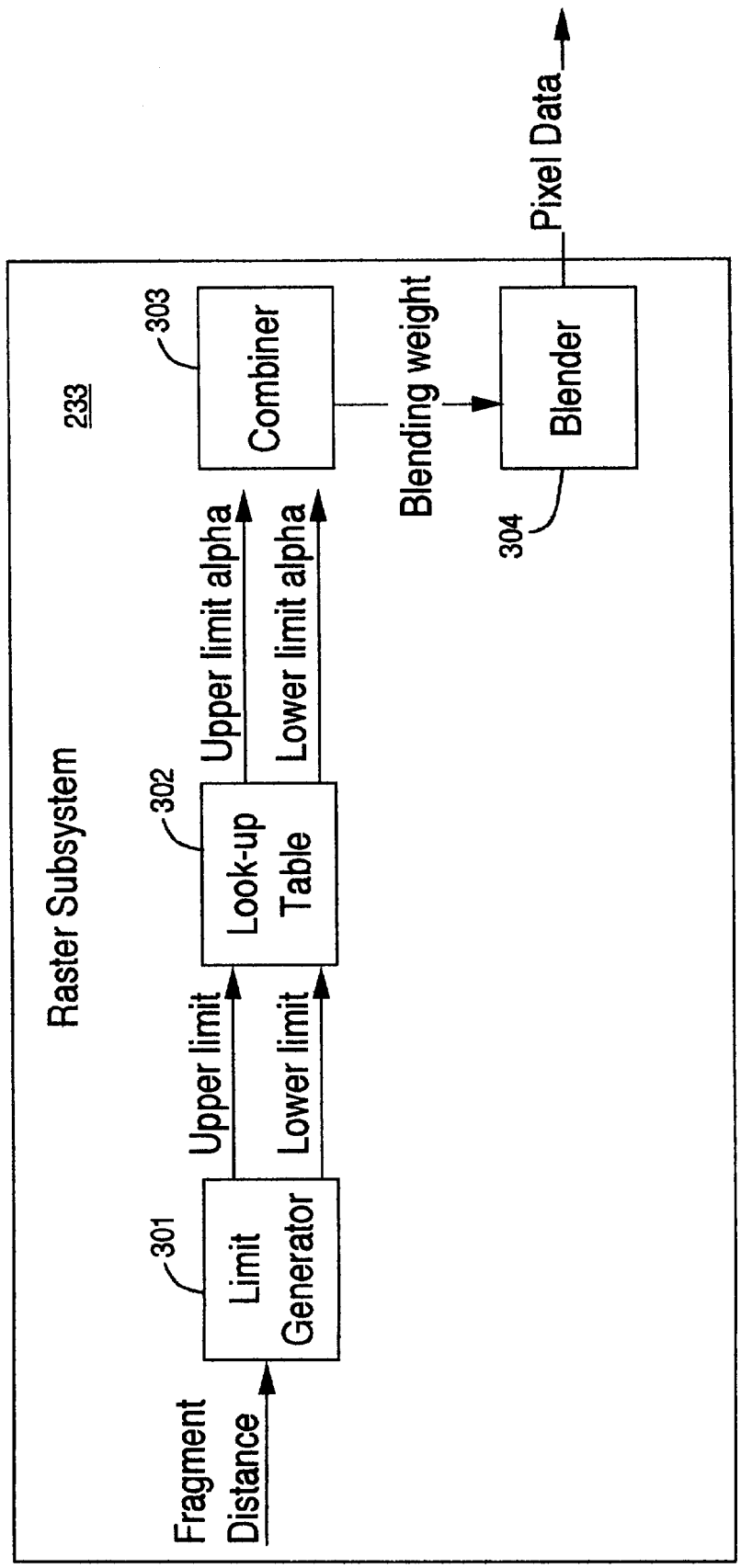
FIG. 3 shows a block diagram of the raster subsystem from the computer system shown in FIG. 2.

FIG. 3 shows a block diagram of a portion of the raster subsystem 233 in accordance with one embodiment of the present invention. As described in the discussion of FIG. 2, raster subsystem 233 is one of the components comprising graphics subsystem 211. Raster subsystem 233 includes a limit generator 301, a look-up table 302, a combiner 303, and a blender 304. Limit generator 301 is coupled to receive fragment parameters (e.g., fragment distance) from scan conversion subsystem 232. Limit generator 301 is coupled to supply upper limit and lower limit information to look-up table 302, which in turn, supplies an upper limit alpha and a lower limit alpha to combiner 303. Combiner 303 is coupled to supply a resulting blending weight to blender 304, which supplies pixel data to frame buffer 209. These components perform the width independent antialiasing process of the present invention.

As described above, scan conversion subsystem 232 scan converts the primitives received from geometry subsystem 231 into pixel data. This pixel data includes the fragments resulting from the scan conversion of the primitives and various corresponding fragment parameters, such as, for example, the location of a fragment relative to the location of the primitive, the color of the fragment, the depth and transparency of the fragment, and the like. As also described above, each fragment typically contributes to the color of its respective pixel. The system of the present invention processes this fragment information to yield a computationally efficient method of antialiasing the primitives being rendered.

Unlike some prior art antialiasing methods, the system of the present invention does not calculate the area of a fragment in order to determine its contribution to a pixels color. The present invention uses the distance from the center of the fragment to the center of a primitive as an input. In the case of a line primitive, this distance is the perpendicular distance from the center of the pixel to the axis of the line primitive. In the case of a point primitive, the distance is measured from the center of the pixel to the center of the point. Determining weighted color contribution based upon this distance, as opposed to computing a fragments area and determining its weight therefrom, is much more computationally efficient and is much faster. Depending upon the particular implementation of the graphics pipeline, this calculation is usually performed in the scan conversion subsystem (e.g., scan conversion subsystem 232). The output of the present invention is pixel data which represents the antialiased primitives (e.g., the color of the pixel after the color of the fragment has been blended with the previous color of the pixel by blender 304). This pixel data is output to frame buffer 209. The process of the present invention and the operation of components 301–304 are further described in the discussion of FIG. 4 below.

Figure 4:
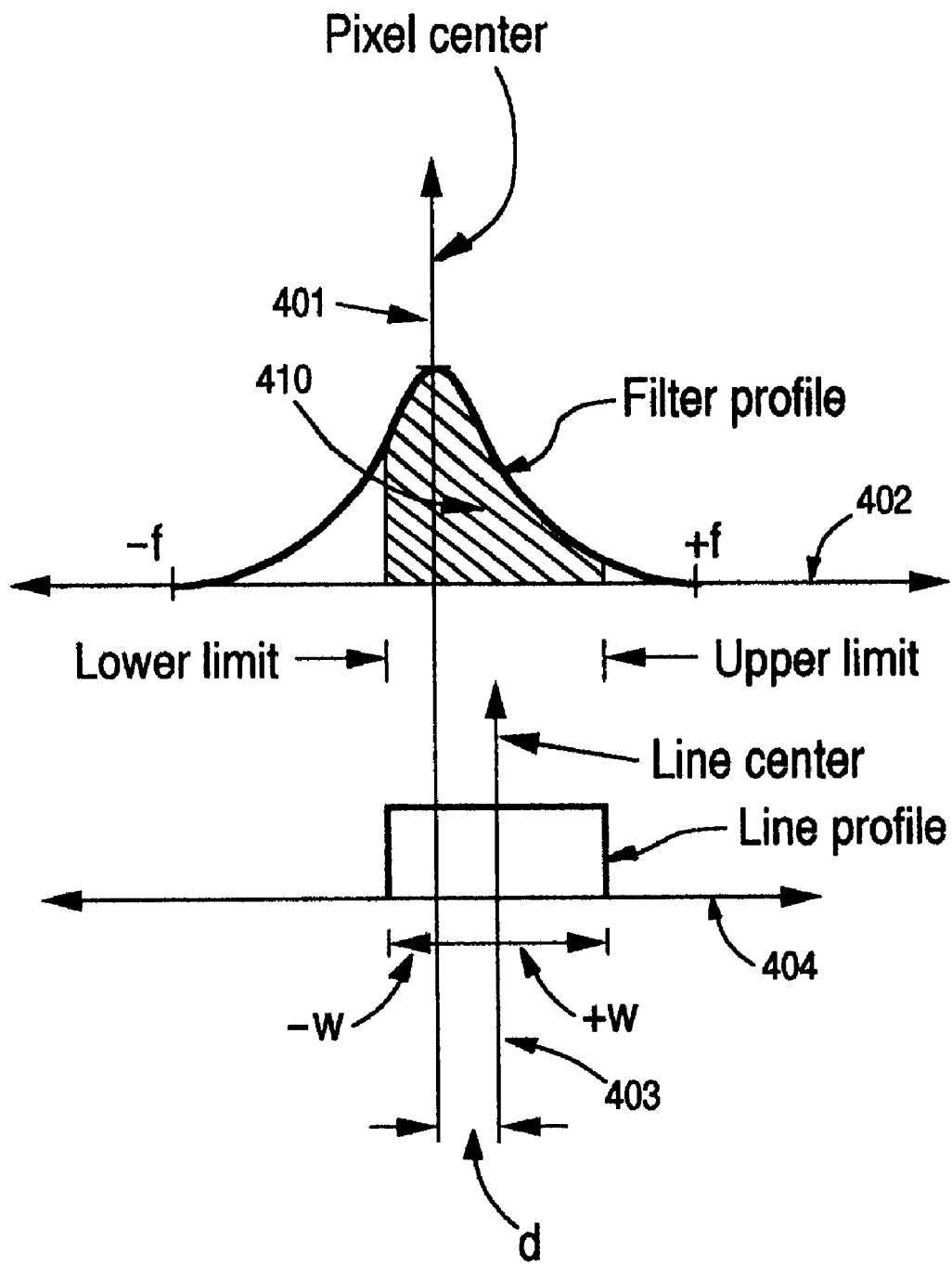
FIG. 4 shows a graph of an antialiasing filter profile and a line primitive profile with respect to the center of a fragment and the center of the line primitive.

Referring now to FIG. 4, a graph 400 of a filter profile and a line profile with respect to a pixel center, and a line center is shown. Graph 400 depicts the operation of the process of the present invention. Vertical line 401 passes through the center of the filter profile and a pixel center and horizontal line 402 extends to the right and left of line 401 in the positive and negative direction. Vertical line 403 passes through the center of the line profile and horizontal line 404 extends to the right and the left of line 403 in the positive and negative direction.

In accordance with the present invention, the blending weight of a fragment (often referred to as the alpha of a fragment) is equal to the convolution of a low pass filter placed at the fragment's center with the line or point primitive. Graph 400 depicts this two dimensionally, where the vertical axis 401 is amplitude and the horizontal axis 402 is distance. The filter profile is a profile of the function h(s), the impulse response of the low pass filter. The filter profile extends towards zero in the positive direction (+f) and towards zero in the negative direction (–f).

Graph 400 also depicts the cross section of a line primitive along the antialiased direction. This is shown by the line profile, where vertical line 403 is amplitude and horizontal line 404 is distance right (positive) and left (negative) of center. The line profile has a width extending in the positive direction (+w) and the negative direction (–w). The line profile is also some distance (d) from the center of the pixel. It should be noted that the profile of a point primitive would appear substantially the same in graph 400 as that of the line primitive.

In accordance with one embodiment of the present invention, the blending weight of a fragment is equal to the convolution of the primitive with the filter profile. Since the cross section of a line primitive or a point primitive along the antialiased direction can be represented by a rectangular box, the convolution is equivalent to an integration of the filter profile (often referred to as a filter kernel) along the rectangular box.

This is shown by the cross hatched region 410 beneath the filter profile and above horizontal line 402. Region 410 represents an integration of the filter profile from the lower limit of the line profile to the upper limit of the line profile. As shown in graph 400, the lower limit corresponds to the edge of the line profile left of the line center (e.g., line 403) and the upper limit corresponds to the edge of the line profile to the right of the line center.

The lower limit and the upper limit shown in FIG. 4 are the limits of the integration of the filter profile. This integration yields a value which corresponds to the blending weight for the particular fragment. By blending the color of this fragment into the existing color of the pixel (e.g., stored in frame buffer 209), the fragment is antialiased. Doing so with each fragment of a primitive antialiases the primitive.

It should be noted, however, that the lower limit and the upper limit must remain within the range of [–f, +f]. For example, the values of the lower limit or upper limit cannot exceed +f on line 402 or be less than –f on line 402. This relationship is expressed by the equation below:

$$\text{Lower limit} = \min\ (f,\ \max\ (d-w,-f))$$

$$\text{Upper limit} = \max\ (-f,\ \min\ (d+w,\ f))$$

This guarantees the lower limit and the upper limit are within [–f,+f].

It should be noted that the integration shown by the cross hatched region 402 is computed by indexing a look-up table with the upper limit and the lower limit as opposed to using a processor intensive software algorithm. The integral of the filter profile shown in FIG. 4 is stored as a plurality of samples in a look-up table. The convolution of the line profile with the filter profile is efficiently determined by indexing the look-up table with the lower limit and the upper limit, and retrieving a corresponding upper limit alpha and lower limit alpha. This is shown by the equations below:

$$\text{Lower limit alpha} = \text{lookup table}(|\text{lowerlimit}|)$$

$$\text{Upper limit alpha} = \text{lookup table}(|\text{upperlimit}|)$$

The upper and lower limit alphas are subsequently combined to yield the fragment alpha, or the blending weight:

$$\text{Fragment alpha} = \text{sign (upperlimit) lookup table}(|\text{upperlimit}|) - \text{sign (lowerlimit) lookup table}(|\text{lowerlimit}|)$$

Thus, in accordance with the present invention, the limit generator 301 of FIG. 3 determines the upper limit and lower limit, the look-up table 302 is indexed to determine the upper limit alpha and the lower limit alpha, the combiner 303 combines the upper limit alpha and lower limit alpha to determine the blending weight, and blender 304 blends the color of the particular fragment into the pixel and sends the resulting pixel data to the frame buffer 209 of FIG. 2.

It should be noted that the blending weight can be determined for point primitives and line primitives of any width. In addition, only half of the filter profile needs to be stored in the look-up table 302 since the filter profile is symmetrical and can be mirrored. It should also be noted that there are various low pass filters which can be used with the process of the present invention.

Figure 5:
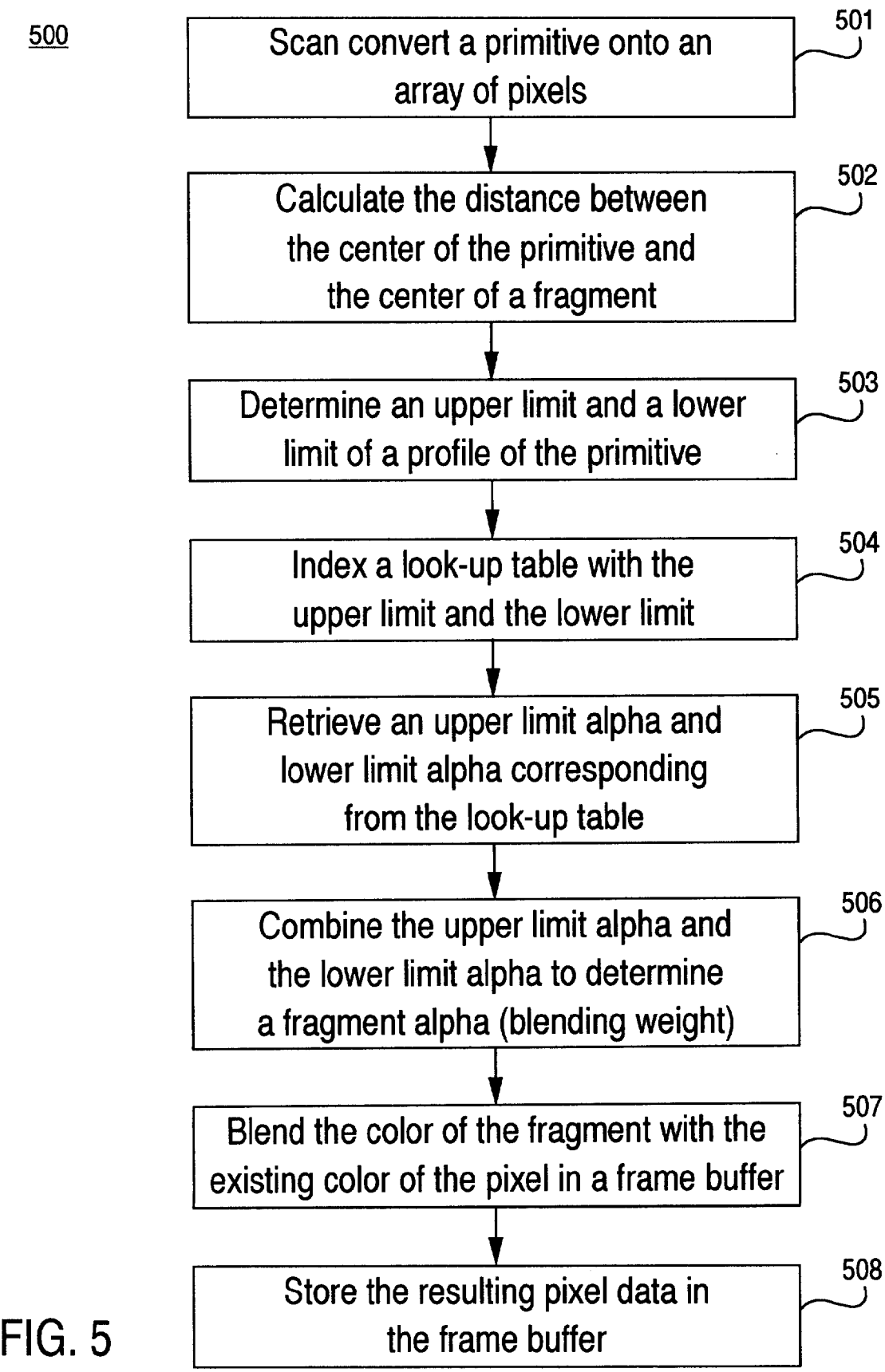
FIG. 5 shows a flow chart of the steps of the operating process of the present invention.

FIG. 5 shows a flow chart of a process 500 in accordance with one embodiment of the present invention. Process 500 shows the steps of the antialiasing process of the present invention as performed by a graphics computer system (e.g., computer system 200 of FIG. 2). Specifically, in order to better teach the process of the present invention, process 500 shows the steps performed in antialiasing one fragment. However, it should be appreciated that for a complex image, computer system 200 performs process 500 thousands (or even millions) of times, as each visible fragment of the image is antialiased.

In step 501, a graphics primitive is scan converted onto a pixel array by the scan conversion subsystem 232 of computer system 200. As described above, the present invention functions with point primitives and line primitives. The primitives are scan converted onto the pixel array, resulting in a plurality of fragments.

In step 502, the distance between the center of the fragment and the center of the primitive is calculated. The present invention defines the center of the fragment as the center of the pixel corresponding to the fragment. Scan conversion subsystem 232 calculates this distance during the scan conversion process. However, as described above, where this calculation is performed depends upon the hardware specifics of each computer system.

In step 503, an upper limit and a lower limit of a profile of a line is determined. As described above, the distance between the center of the fragment and the center of the primitive is used to determine an upper limit of integration for a filter profile and the lower limit of integration for the filter profile. The center of the primitive corresponds to the center of a profile of the primitive with respect to distance from the center of the fragment (e.g., as shown in FIG. 4).

In step 504, a look-up table is indexed with the upper limit and the lower limit. As described above, the look-up table contains a plurality of values representative of the impulse response of a low pass filter. The look-up table is indexed with respect to distance from the center of the fragment.

In step 505, an upper limit alpha and a lower limit alpha corresponding to the upper and lower limits are retrieved from the look-up table. As shown in FIG. 4 above, the upper limit and lower limit are used to retrieve values corresponding to samples of the filter profile at the upper limit and the lower limit.

In step 506, the upper limit alpha and the lower limit alpha are combined to determine the integral of the filter profile between the upper and lower limits. This value is the fragment alpha, or blending weight, used for antialiasing.

In step 507, the color of the fragment and the existing color of the pixel (e.g., the color of the pixel stored in the frame buffer) are blended using the fragment alpha (blending weight).

In step 508, the resulting pixel data (the blended color for the pixel) is sent from the blender (e.g., blender 304 of FIG. 4) to the frame buffer. In this manner, each visible (e.g., non-hidden) fragment is rendered and antialiased.

Thus, the present invention provides an antialiasing process which is inexpensive to implement, yet highly effective. The system of the present invention uses less memory than prior art antialiasing solutions of comparable quality, and does not require repetitive processor intensive calculations. The process of the present invention is fast enough for demanding applications, without requiring very expensive, high performance graphics hardware for its implementation. Additionally, the process of the present invention provides high quality, width independent antialiasing, wherein the antialiasing quality does not degrade as the width of the graphics primitives change.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a graphics computer system, an efficient method for width independent antialiasing of point primitives and line primitives in a graphics computer system, the method comprising the graphics computer system performing the steps of:

calculating an integral of an impulse response of a low pass filter;

storing a plurality of values representative of the impulse response into a look up table;

rasterizing a primitive;

calculating the distance of a fragment from the center of the primitive;

indexing the lookup table with the distance of the fragment from the center of the primitive to retrieve a corresponding one of the plurality of values;

blending the color of the fragment into a frame buffer using the corresponding one of the plurality of values as a blending weight such that the primitive is properly antialiased regardless of the width of the primitive.

2. The method of claim 1 wherein the impulse response of the low pass filter is used to determine a filter profile adapted to antialias the fragment.

3. The method of claim 2 wherein an integral of the filter profile is stored as the plurality of values in the look up table.

4. The method of claim 3 wherein the filter profile is symmetrical and half of the integral of the filter profile is stored as the plurality of values in the lookup table.

5. The method of claim 1 wherein each of the plurality of values is indexed in the lookup table with respect to their respective distance from the center of the fragment.

6. The method of claim 1 wherein the primitive is a point primitive or a line primitive.

7. The method of claim 6, wherein the center of a line primitive is a major axis of the line primitive.

8. The method of claim 1, wherein a first limit of the primitive and a second limit of the primitive are determined with respect to distance from the center of the fragment and the lookup table is indexed with the first limit and the second limit to retrieve a corresponding first value and a second value, and wherein the first value and second value are combined to yield the blending weight.

9. The method of claim 1, wherein the color of the fragment is blended into the color of a pixel corresponding to the fragment using the blending weight and a resulting color of the pixel is stored in the frame buffer.

10. A width independent antialiasing system for rendering width independent antialiased point primitives and line primitives in a graphics computer system, comprising:

a lookup table for storing a plurality of values representative of an integral of an impulse response of a low pass filter;

a limit generator coupled to the look up table, the limit generator adapted to receive fragment information from the graphics computer system, wherein the fragment information includes a distance of a fragment from a center of a point primitive or a center of a line primitive, the limit generator determining an upper limit and a lower limit therefrom and indexing the lookup table with the upper limit and the lower limit to retrieve a corresponding upper limit value and a lower limit value;

a combiner coupled to the lookup table to receive the upper limit value and the lower limit value, the combiner adapted to combine the upper limit value and lower limit value to generate a blending weight and provide the blending weight to the graphics computer system, wherein the blending weight is used by the graphics computer system to blend a color of the fragment with a color of a pixel corresponding to the fragment to efficiently antialias the fragment independent of the width of the point primitive or width of the line primitive.

11. The system of claim 10 wherein the plurality of values stored in the lookup table represent the integral of a filter profile.

12. The system of claim 11 wherein the filter profile is symmetrical and half of the integral of the filter profile is stored as the plurality of values representative of the impulse response.

13. The system of claim 10 wherein each of the plurality of values is indexed in the lookup table with respect to their respective distance from the center of the fragment.

14. The system of claim 10 wherein the center of the line primitive is a center axis of the line primitive.

15. In a graphics computer system, a method for width independent antialiasing of point primitives and line primitives, the method comprising the graphics computer system performing the steps of:

calculating an integral of an impulse response of a low pass filter, wherein the impulse response is used to determine a filter profile adapted to antialias a fragment;

storing a plurality of values representative of an integral of the impulse response into a look up table, wherein the plurality of values represent the integral of the filter profile;

rasterizing a primitive into a frame buffer, wherein the primitive is a point primitive or a line primitive;

calculating the distance of the fragment from the center of the primitive;

indexing the lookup table with the distance of the fragment from the center of the primitive to retrieve a corresponding one of the plurality of values; and blending the color of the fragment into the frame buffer using the corresponding one of the plurality of values as a blending weight such that the primitive is properly antialiased regardless of the width of the primitive.

16. The method of claim 15 wherein the filter profile is symmetrical and half of the integral of the filter profile is stored as the plurality of values representative of the impulse response.

17. The method of claim 15 wherein each of the plurality of values is indexed in the lookup table with respect to their respective distance from the center of the fragment.

18. The method of claim 17 wherein the center of the primitive is a normalized center of the primitive if the primitive is a point primitive, or the center of the primitive is a center axis if the primitive is a line primitive.

19. The method of claim 15 wherein a first limit of the primitive and a second limit of the primitive are determined with respect to distance from the center of the fragment and the lookup table is indexed with the first limit and the second limit to retrieve a corresponding first value and a second value, wherein the first value and second value are combined to yield the blending weight.

20. The method of claim 15 wherein the color of the fragment is blended into the color of a pixel corresponding to the fragment using the blending weight and a resulting color of the pixel is stored in the frame buffer.

* * * * *